United States Patent [19]

van Eijck et al.

[11] 4,237,498
[45] Dec. 2, 1980

[54] METHOD OF ADDRESSING AND/OR LOCATING INFORMATION ON A RECORD CARRIER

[75] Inventors: Gustavus L. P. van Eijck; Henri J. L. Simons, both of Eindhoven, Netherlands

[73] Assignee: U.S. Philips Corporation, New York, N.Y.

[21] Appl. No.: 6,393

[22] Filed: Jan. 25, 1979

[30] Foreign Application Priority Data

Jan. 30, 1978 [NL] Netherlands .................. 7801041

[51] Int. Cl.³ .............. G11B 15/52; G11B 23/36; G11B 27/22
[52] U.S. Cl. ............................. 360/72.2; 360/74.4
[58] Field of Search ..................... 360/72.2, 72.4, 73, 360/49, 62, 71, 72.1, 74.4, 74.1

[56] References Cited

U.S. PATENT DOCUMENTS

| | | | |
|---|---|---|---|
| 3,467,949 | 9/1969 | Moore | 360/72.2 |
| 3,727,203 | 4/1973 | Crossman | 360/72.2 |
| 3,851,116 | 11/1974 | Cannon | 360/72.2 |
| 3,950,782 | 4/1976 | Carey et al. | 360/72.2 |

Primary Examiner—Alfred H. Eddleman
Attorney, Agent, or Firm—Thomas A. Briody; Robert T. Mayer; James J. Cannon, Jr.

[57] ABSTRACT

Method and apparatus for writing and/or reading an address code on a record carrier, preferably for audio signals, which code consists of a number of preamble pulses, a number of code pulses and a number of postamble pulses equal to the number of preamble pulses, while between the code pulses check pulses may be inserted.

9 Claims, 4 Drawing Figures

METHOD OF ADDRESSING AND/OR LOCATING INFORMATION ON A RECORD CARRIER

BACKGROUND OF THE INVENTION

1. Field of the Invention

The invention relates to a method of addressing and/or locating information, in particular audio-information, on a record carrier, the addresses being or having been recorded in the form of pulse trains in the same track of said record carrier.

2. Description of the Prior Art

Such a method is known from U.S. Pat. No. 4,120,006, the addresses consisting of a train of pulses, while the number of pulses is one higher than the sequence number of the information. The addition of one pulse to the address number serves to prevent a response to isolated spurious pulses. However, when a plurality of spurious pulses appear successively, the address is detected erroneously. Moreover, when an audio recorder plays continuously, the address will become audible as a short tone owing to the use of a frequency of 200 Hz, which follows from the 5-msec period.

It is the object of the invention to avoid these drawbacks and to provide a simple yet reliable method of locating the desired information.

SUMMARY OF THE INVENTION

Searching for the desired information will generally be effected at the first forward winding or fast rewinding speed, the playback head being preferably disengaged from the tape. If this head is not in engagement with the tape and, in general, the head-to-tape distance is not constant, it is desirable to select the frequency of the code not too high. Moreover, the code signal and/or the harmonics of said signal should have no adverse effect during playback. On the other hand, the frequency should not be too low, because otherwise the length required for the code is too great. During fast winding, when the tape speed is 10-40 times as high as the playback speed, this frequency also becomes 10-40 times as high. Hence, since the scanning speed may vary by a factor 4, the tape speed should be measured, so that speed information should be inverted on both sides of the code, because this code is approached from different sides during forward winding and rewinding.

For this purpose, in accordance with the invention, an address is recorded with a frequency which is inaudibly low at recording and play-back speed (sub-audio frequency). The address is entered into a first or address memory and, as the case may be, displayed on an indicator. Thereafter at least two preamble pulses and a member of pulses and intervals, corresponding to the ones and zeroes of the digitized address, and a number (equal to the number of preamble pulses) of post-amble pulses are, recorded on the tape consecutively for the purpose of locating the address. This coded address is entered into the address memory, the previous address contained in this address memory being erased simultaneously. Thereafter, transport of the record carrier is started and when an address passes a read head, a pulse counter is started upon the first preamble pulse, which counter is advanced one step upon each subsequent pulse. The interval between the first two preamble pulses is measured and compared with values stored in a second memory, which values correspond to the minimum and maximum speed of the record carrier. If the measured value lies between said values, it is stored in a third memory. Thereafter, if the number of preamble pulses is greater than two, the interval between consecutive preamble pulses is measured. If, within certain limits these measured values are equal to the interval between the first and the second preamble pulses, it is subsequently ascertained whether a code pulse appears in a time window around the end of subsequent intervals, which are equal to the mean of the preamble intervals. If the code pulse does not appear, a binary value is stored in a code memory while if it does appear a different binary value is stored in the same code memory. The pulse counter is advanced one step after each interval in either case, until said pulse counter reaches a count which is equal to the sum of the total number of preamble, code and, as the case may be, postamble pulses. The content of the code memory is compared with the content of the address memory. If said contents correspond, the record carrier transport is either stopped in anticipation of re-starting at playback speed, or is directly switched to playback speed. If the content of the code memory is smaller than that of the address memory, the record carrier is moved forward and if the content of the code memory is greater than that of the address memory the record carrier is moved in the reverse direction, while the last-detected code can be displayed on an indicator.

In accordance with a variant of the method, in order to prevent the first pause after a random sequence of spurious pulses from being interpreted as a sequence of zeros, i.e. as an address, check bits are inserted between the code pulses, the beginning of the code pulse intervals being synchronized with the aid of said check bits and/or after the storage of the code in the code memory, the presence of said check bits being ascertained during searching.

As a result of this, the influence of speed variations is reduced, but the possible number of addresses in the case of the same number of code pulses per check bit is reduced by 50%. In accordance with a further variant of the method, this decrease can be reduced substantially while maintaining the advantages, in that a check bit can be situated in one of a group of adjacent fixed locations in the row of code bits. Thus, in the case of two adjacent fixed locations the reduction will be only 25%. In order to prevent a random spurious signal from being intrepreted as a code, in accordance with a further variant of the method, the code is rejected as an address, after the code has been read into the code memory, if all code bits have the same value.

For the sake of convenience it is assumed in the present application that the addresses consist of pulse trains, but this is to be understood to include also sinusoidal signals.

An apparatus for carrying out the method, which apparatus is provided with means for inserting addresses in the information tracks in the interval between every two information sequences on a record carrier, comprises:

a first or address memory connected to a device for erasing the address memory and entering an address in digital form into the address memory and, as the case may be;

an indicator for displaying the address in the address memory;

an address generator, which is also connected to the address memory, which generator generates an address corresponding to the address in the address memory with a frequency which is inaudibly low at recording and playback speed (sub-audio frequency), which address comprises at least two preamble pulses, a number of pulses and intervals corresponding to the ones and zeros in the address memory, and a number of post-amble pulses equal to the number of preamble pulses, the generator output being connected to a circuit to which a write head for recording the addresses is connected;

a read head connected to a pulse counter which is started upon the arrival of the first preamble pulse of an address and which is advanced one step by each subsequent pulse (and interval) and a time measuring device which is also started by the first preamble pulse and which measures the interval between every two preamble pulses;

a second memory which stores the intervals between the first two preamble pulses, corresponding to the minimum and maximum speed of the record carrier;

a first comparator to which both the time measuring device and the second memory are connected, while its output at which a signal appears if the interval measured by the time measuring device falls between the values stored in the second memory, is connected to a third memory, which is also connected to the time measuring device, for the storage of the measured interval, the time measuring device being connected either directly, or, if the number of preamble pulses is greater than two, via (a) a second comparator, which is also connected to the third memory, for the comparison of the intervals between the first two preamble pulses and the subsequent post-amble pulses; and (b) a device for determining the mean value of these intervals, to a time window circuit which supplies a signal for a specific period of time around the end of each mean interval, to which time window circuit a sampling circuit is connected which during the time window determines whether a pulse appears or does not appear, which sampling circuit is connected to a code memory in which the code is stored;

a first switching device which connects the outputs of the code memory to first inputs of a third comparator, whose second inputs are connected to the address memory and whose first output, at which a signal appears if the content of the code memory corresponds to the contact of the address memory, leads to the stop switch of the record carrier, while a second output of the third comparator at which output a signal appears if the content of the code memory is smaller than that of the address memory, is connected to the switch for the forward transport of the record carrier, while a third output of the third comparator at which output a signal appears if the content of the code memory is greater than that of the address memory, leads to the switch for the reverse transport of the record carrier.

In accordance with a further embodiment of an apparatus for carrying out the method, said location or said locations of the code memory, where the check bit or the check bits is or are stored, is or are respectively connected directly or through a first AND-circuit to the control input of a second switching device which is connected in series with the first switching device.

In accordance with another embodiment of an apparatus for carrying out the method, those adjacent locations in the code memory, which should contain one check bit in the code, are connected to the input of an OR-circuit, the output or outputs of the OR-circuit or OR-circuits being connected to the control input of the second switching device directly or through the first AND-circuit respectively.

In a further embodiment of an apparatus in accordance with the invention, the outputs of the code memory are each connected to an input of a second AND-circuit, whose output leads to the control input of a third switching device, which is connected in series with the first switching device.

In another apparatus for carrying out the method, there is provided a programmable signal processing unit which is controlled by a program.

The invention also relates to a record carrier provided with a signal or signals for carrying out the method.

BRIEF DESCRIPTION OF THE DRAWINGS

The invention will now be explained in more detail by means of the following description of the Figures, of which

DESCRIPTION OF THE PREFERRED EMBODIMENTS

Figure 1:
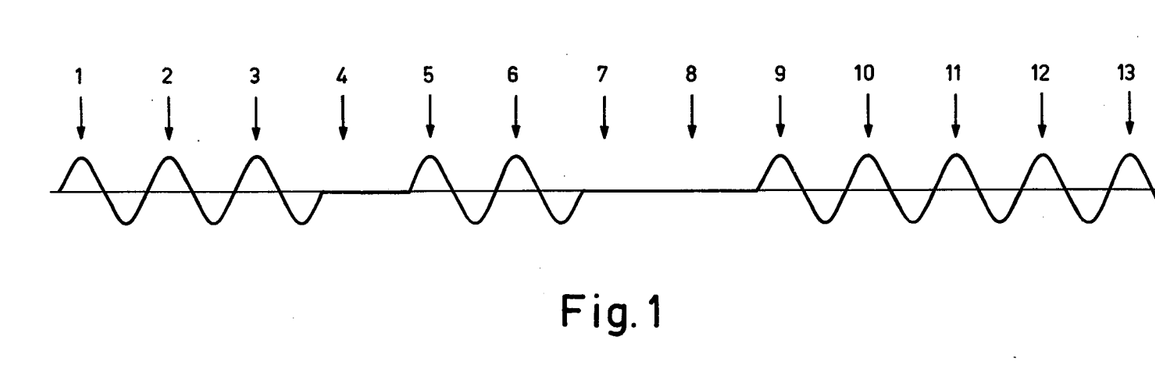
FIG. 1 shows a pulse train corresponding to an address.

FIG. 1 shows a pulse train which represents an example of an address. In this 13-bit address the preamble pulses which serve for synchronization, are situated at the locations 1, 2 and 3, the actual code, which in the present example comprises 7 bits, at the locations 4 through 10, while the post-amble pulses are situated at the locations 11, 12 and 13. These post-amble pulses serve as preamble pulses for reverse tape transport. The 7-bit code in principle enables 128 addresses to be formed. However, it is of practical advantage to employ one or more of said pulses also as synchronizing pulses. If two pulses, for example pulses 6 and 8, were used as synchronizing pulses, the number of possible addresses would be reduced to 32 by a factor 4. By using one of two adjacent pulses as check pulse, for example either pulse 5 or pulse 6, and either pulse 8 or pulse 9, it is still possible to obtain 72 addresses ($8 \times 3 \times 3$). In the example of FIG. 1 the eighth pulse is missing, but pulse no. 9 is present. It will be evident that the number of code bits may be increased or reduced according as the required number of addresses is greater or smaller.

Figure 2:
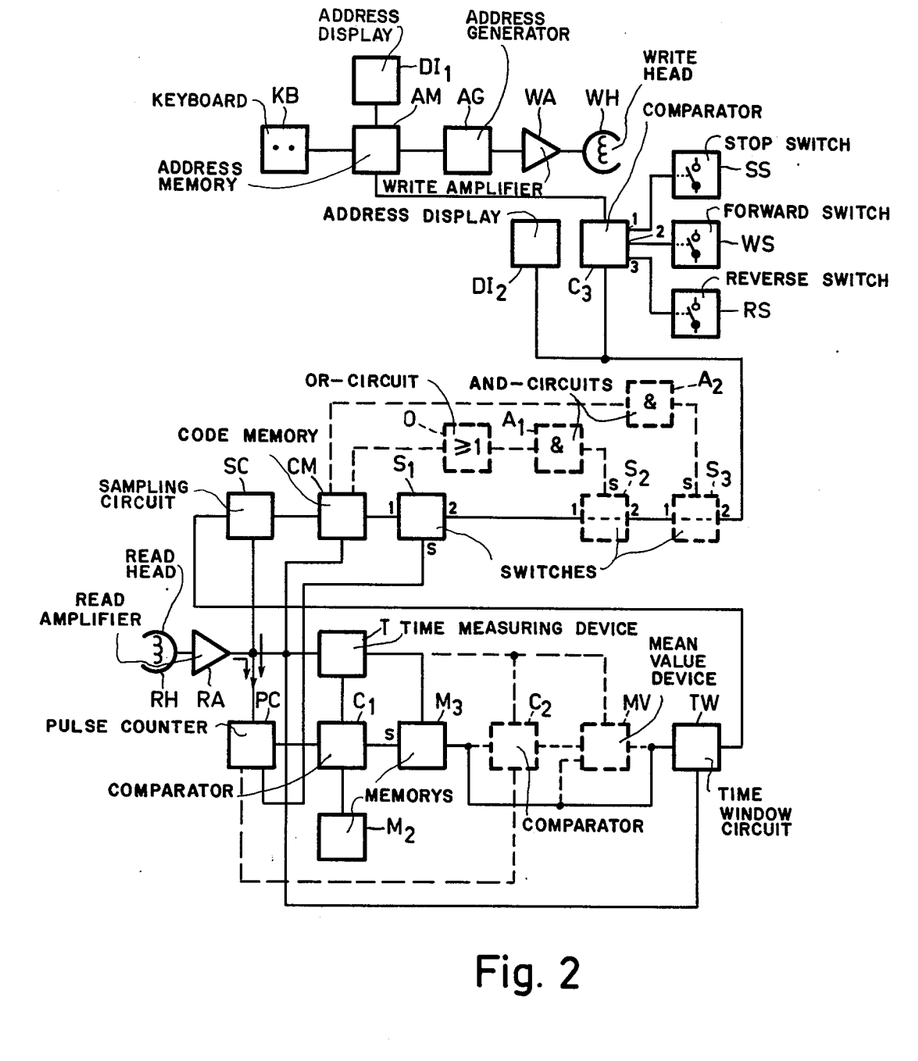
FIG. 2 shows a block diagram of an apparatus in accordance with the invention.

In the block diagram of an apparatus in accordance with the invention shown in FIG. 2, the keyboard KB is connected to a first or address memory AM, to which an address, which has been selected at the keyboard KB, is applied in digital form and is stored therein, while any previous address is erased simultaneously. Said address can be displayed on an indicator $DI_1$. When an address is recorded, this address memory is connected to the address generator AG, which applies said address, to which the preamble and post-amble bits have been added, with a sub-audio frequency to the write head WH by the write amplifier WA, after which said address is recorded on the record carrier. During searching the address is simultaneously applied to a pulse counter PC and to a time measuring device T by the read head RH and the read amplifier RA, which device T is started by this first pulse. Upon the arrival of the second pulse the pulse counter PC is again advanced one step, while in a first comparator $C_1$ the interval measured by the time measuring device T is compared with the values stored in the second memory $M_2$, which correspond to the minimum and maximum speed of the record carrier. If the measured interval falls outside these values, the first pulse is definitely no preamble pulse of an address and the entire circuit is reset in anticipation of a subsequent pulse. However, if the second pulse lies within said time interval, the first comparator $C_1$ supplies a signal to the control input s of a first memory $M_3$, in which the measured time interval between the two preamble pulses is stored. Upon the arrival of the third preamble pulse the pulse counter PC is again advanced one step, while the reset time measuring device T now measures the interval between the second and the third preamble pulse, the measured value being compared with the value stored in the third memory $M_3$ in a second comparator $C_2$ upon arrival of the third preamble pulse, after which these two values are averaged in a device for determining the mean value MV and this value is subsequently applied to a time window circuit TW, which for a specific period of time around the end of a mean interval allows a sampling circuit SC which is connected thereto to ascertain whether a pulse appears or does not appear during said time window. When a pulse appears a corresponding binary value, for example a one, is stored in the code memory CM and, if no pulse appears, the other binary value, for example a zero. This procedure is repeated until all code bits are stored in the code memory CM. During storage of each code bit the pulse counter PC is simultaneously advanced one step and as soon as its count corresponds to the sum of the number of preamble pulses and the maximum number of code pulses it supplies a signal to a first switching device $S_1$ and connects the outputs 2 of said device to the inputs 1 which are connected to the outputs of the code memory CM.

If between the code pulses, check pulses have been inserted which have a fixed location in the code, those locations of the code memory CM where the check bits are stored are connected to the control input, S of a second switching device $S_2$ via a first AND-circuit $A_1$, which second switching device is connected in series with the first switching device $S_1$ and whose inputs 1 are connected to the outputs 2 in the presence of said check bits. When the check bits in the code are situated in one of a group of adjacent locations, in the present example two, the first AND-circuit $A_1$ is preceded by one OR-circuit O for every group of check bit locations, the output of each OR-circuit O leading to an associated input of the first AND-circuit $A_1$. In order to check whether all code bits have the same values, for example corresponding to pulses in the code, which means that a continuous spurious signal appears, all outputs of the code memory CM are connected to a second AND-circuit $A_2$, whose output leads to a control input s of a third switching device $S_3$, the signals at the inputs 1 thereof being only transferred to the outputs 2 if not all inputs of the second AND-circuits have values corresponding to a check pulse. In the other case, the entire circuit is reset. Obviously, it is also possible to store the preamble and/or post-amble pulses in the code memory and to perform this check at the end of the complete address. If all requirements for a correct code are met, the outputs of the code memory are each connected to an associated second input of a third comparator $C_3$ to whose first inputs the address memory AM is connected in which the desired address is stored. When the detected address and the desired address are the same, that is, when the content of the code memory CM corresponds to the content of the address memory AM, a signal appears at the first output 1 of the third comparator $C_3$ which activates the stop switch SS, so that the record carrier is stopped. If desired, the record carrier transport may be started for playback at the appropriate speed after a time which may be variable, or the stop switch SS may be used as playback switch. If the content of the code memory is smaller than that of the address memory, a signal appears at the second output of the third comparator $C_3$ and the switch WS for forward transport of the recorded carrier is closed and a subsequent address is searched for. The third case occurs if the content of the code memory is greater than that of the address memory, in which case a signal appeas at the third output of the third comparator $C_3$, so that the switch RS for reverse transport is actuated and the record carrier is rewound.

Obviously, it is possible to display the last-detected address on a second indicator $DI_2$, so that an indication is obtained whether the correct address is approaching or not. Alternatively, instead of the indicators $D_1$ and $D_2$, one indicator could be used, which should then be switchable at option.

If only two preamble pulses appear, the third memory $M_3$ is connected directly to the time window circuit TW, because the second comparator $C_2$ and the device for determining the mean value MV are then redundant.

Figure 3:
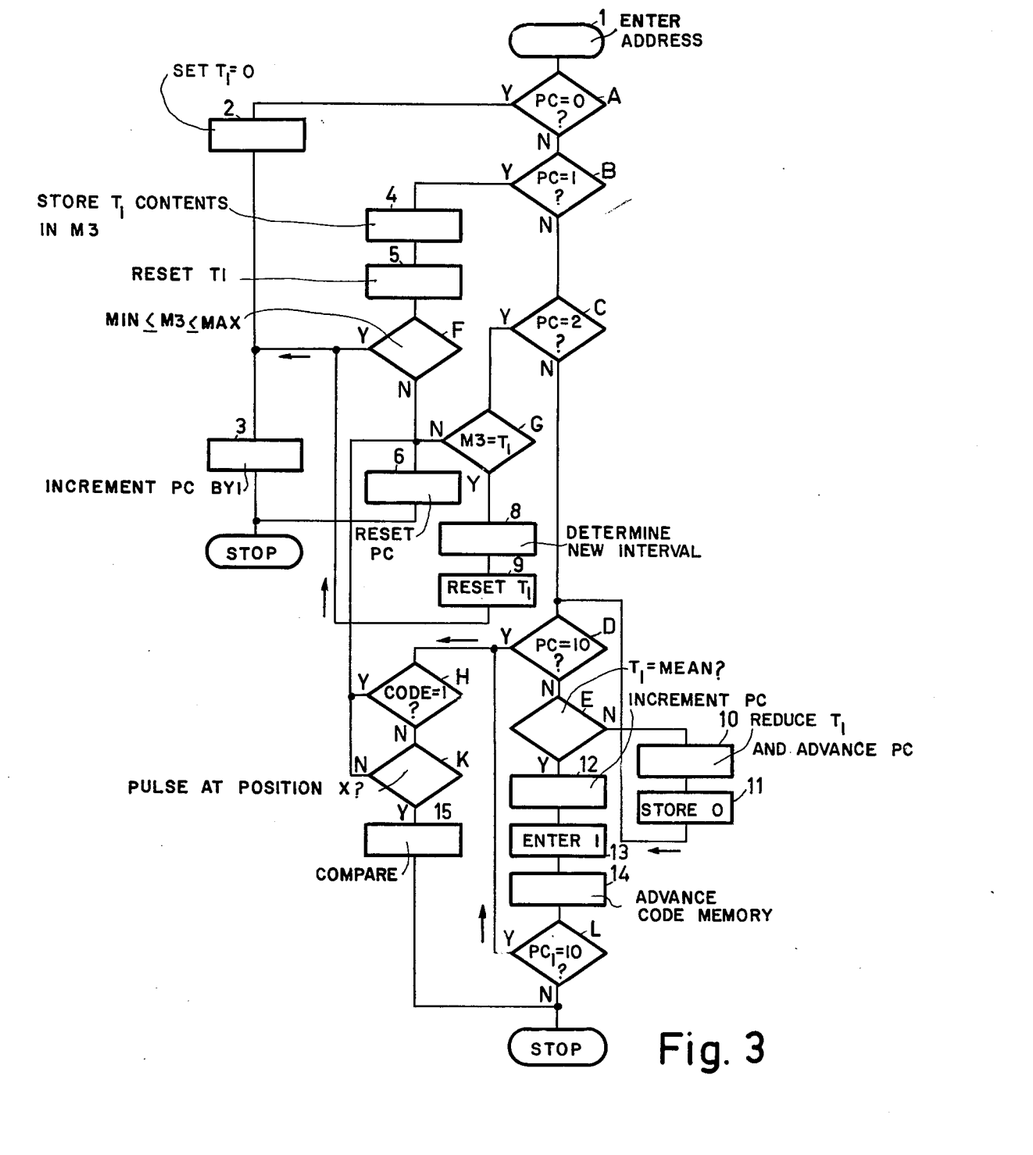
FIG. 3 is a flow chart of a digital signal processing unit which is controlled by a program.

FIG. 3 shows a flow chart for an example of an apparatus in accordance with the invention for locating an address, provided with a programmable digital signal processing unit which is controlled by a program.

The address is entered in 1 after which it is ascertained in A whether a pulse counter $PC_1$ is at zero; if this is the case as at the beginning of the address, this decision is processed in block 2, i.e. a time measuring device $T_1$ is set to zero and starts to measure the time, while the pulse counter $PC_1$ in block 3 is advanced one step, i.e. set to 1, after which this operation is completed and the second pulse is awaited. Upon the arrival of the second pulse it is again ascertained in block A whether the pulse counter $PC_1$ is at 0 and, since this is not the case, it is subsequently ascertained in block B whether the pulse counter $PC_1$ is at 1. In the present example this is the case, after which in block 4 the interval between the two preamble pulses, which has been measured by the time measuring device $T_1$, is stored in a memory $M_3$ and the time measuring device $T_1$ in block 5 is reset to zero, after which said device again starts with a measurement. Subsequently, it is ascertained in block F whether the interval measured in the time measuring device $T_1$ lies between two values defined by the minimum and maximum speed of the record carrier. If this is not the case, the two pulses are not address pulses and the pulse counter $PC_1$ in block 6 is reset, and so is the code memory $CM_1$. Conversely, if this is the case, the pulse counter $PC_1$ in block 3 is advanced one step so that it is now at 2, after which the third preamble pulse is awaited. Upon the arrival of said pulse it is ascertained in block A that the pulse counter is not at zero and in block B that it is not at 1, after which in block C it is ascertained that the pulse counter is at 2. Subsequently, it is checked in block G whether the interval stored in the third memory $M_3$ within certain limits equals the interval measured by the time measuring device $T_1$; if this is not the case, the pulse counter $PC_1$ and the code memory $CM_1$ are again reset in block 6. If it is, a new interval is determined in block 8, which is equal to the mean of the two intervals between the three preamble pulses, after which the time measuring device $T_1$ in block 9 is again reset to 0 and in block 3 the pulse counter $PC_1$ is again advanced one step, so that it is not at 3. Subsequently, the arrival of the next pulse is awaited and upon its arrival it is ascertained in block A that the pulse counter is not at zero, in block B that it is not at 1, in block C that is not at 2 and in block D that it is not at 10. Since either the fifth or the sixth location in the address should be a pulse, for example in the code of FIG. 1 both the fifth and the sixth bit, it is ascertained in block E whether the interval between the third preamble pulse and the pulse which has now arrived corresponds to the mean interval within certain limits. If this is not the case, the setting of the time measuring device $T_1$ is reduced by the interval in block 10, the pulse counter $PC_1$ is advanced one step and in block 11 the code is stored as a 0 in the code memory. If this code memory takes the form of a shift register, the content of this shift register is shifted one position. Subsequently, it is again ascertained in block D whether the pulse counter is at 10 and again this is not the case, so that in block E it is ascertained again whether the setting of the time measuring device $T_1$ corresponds to the mean interval. If this is not the case, as in position 8 of FIG. 1, the last-mentioned procedure is repeated through block 10 and block 11 until it is ascertained in block E that the setting of the time measuring device $T_1$ within certain limits corresponds to the mean interval, after which the block 12 the pulse counter is again advanced one step and in block 13 a 1 is entered into the code memory and in block 14 the code memory is advanced one location. In block L it is determined whether the pulse counter $PC_1$ is at 10. If this is not the case, the next pulse is awaited. This procedure continues until it is ascertained that the pulse counter is at 10, after which in block H it is checked whether the code consists of ones only. If this is the case, the detected address is a false address and the pulse counter $PC_1$ and the code memory $C_1$ are again reset by block 6. If it is not the case, it is checked in block K whether there is a pulse at one of the positions 5 and 6 or 8 and 9 of the address. Should this not be the case, the address is false and the pulse counter in the code memory is again set to 0 by block 6. If it is the case, the code is processed in block 15, i.e. the comparator $C_3'$ determines whether the code is in conformity with the desired address from an address memory $AM_1$. If it is, the record carrier is stopped, if it is not it is ascertained whether the content of the code memory $C_1$ is smaller than that of the address memory $AM_1$, in which case the record carrier transport is continued, and if it is greater the record carrier is wound in the reverse direction.

Figure 4:
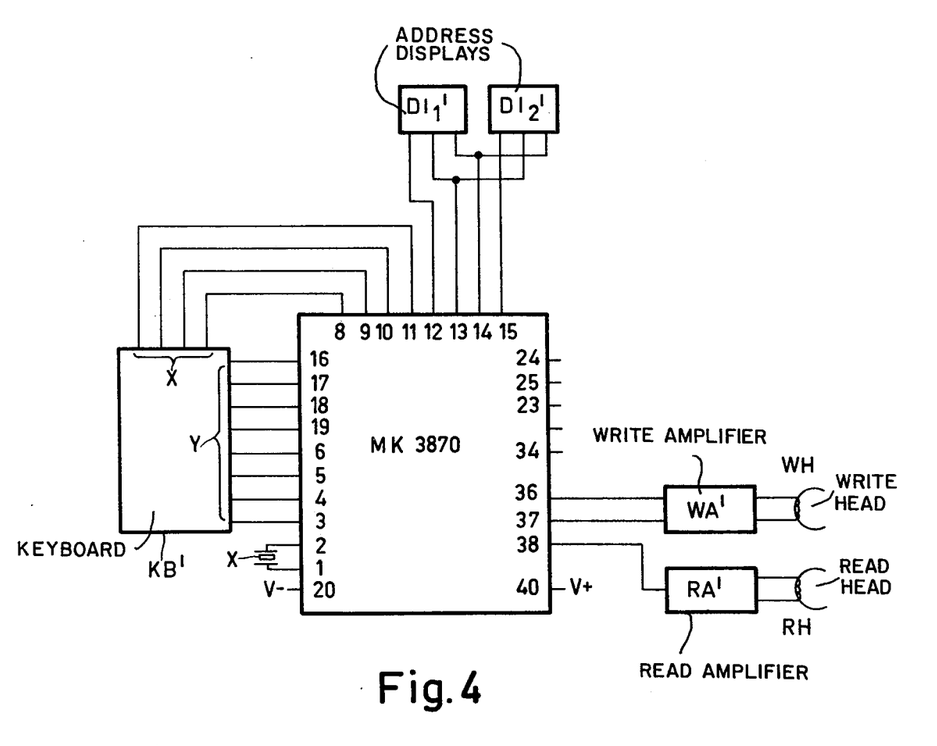
FIG. 4 is a block diagram in which the programmable signal processor is a microprocessor.

FIG. 4 shows an associated diagram in which the programmable digital signal processing unit is a Mostek type MK3870 "Micro-Computer." The keyboard KB' is constructed in accordance with an X-Y matrix whose x-outputs are connected to the terminals 8, 9, 10 and 11 of the micro-computer, while the y-outputs lead to terminals 3, 4, 6, 5, 19, 18, 17 and 16. Terminals 12, 13 and 14 are connected to the indicator $DI_1'$ and terminals 13, 14 and 15 to the indicator $DI_2'$. A crystal X is connected to terminals 1 and 2, which crystal forms part of the clock generator of the other time measuring device T' which forms part of the micro-computer.

Terminal 24 is connected to the actuating device for the slide on which the heads are mounted, terminal 25 to the actuating device of the pressure roller, terminal 23 to the connection of the winding motor for rewinding and terminal 34 to the connection of the winding motor for forward winding. The signals on these terminals are controlled by the stop switch SS', the forward transport switch WS', and the reverse transport switch RS', which switches are all located in the micro-computer, together with the address memory AM', the address generator AG', the time measuring device T', the pulse counter PC', the three comparator $C_1', C_2'$ and $C_3'$, the second and third memories $M_2'$ and $M_3'$, the time window circuit TW', the averager MV', the sampling circuit SC', the code memory CM', the first, second and third switching device $S_1'$, $S_2'$ and $S_3'$, the OR-circuit O', and the first and second AND-circuit $A_1'$ and $A_2'$. The truth table for terminals 23, 24 and 25 and 34 is as follows:

| terminal no. | stop | play | fast forward winding | fast reverse winding |
| --- | --- | --- | --- | --- |
| 23 | 0 | 0 | 0 | 1 |
| 24 | 0 | 1 | 0 | 0 |
| 25 | 0 | 1 | 0 | 0 |
| 34 | 0 | 1 | 1 | 0 |

In this case there is provided only one motor for forward and reverse winding, whose direction of rotation is reversible.

The write amplifier WA' is connected to terminals 36 and 37, the voltage from terminal 36 charging the capacitor of the integrator on the input of the write amplifier in a positive sense and the voltage on terminal 37 in a negative sense, so that a triangular voltage is produced which is converted into a code signal in the write amplifier. The read amplifier RA' is connected to terminal 38. Finally, terminal 40 is connected to the positive supply voltage terminal and terminal 20 to the negative supply voltage terminal.

The time measuring device, mentioned in the present Application, may for example take the form of a counter controlled by a clock generator, which counter is started by a first pulse and is stopped by a second pulse, which switching operation can be performed by means of a bistable multivibrator. The counter position determines the time interval measured.

The frequency of said clock generator during searching at playback speed can be reduced in conformity with the ratio between playback speed and winding speed.

A device for determining the mean value could be realized by storing the two counts of the time measuring above in the memory and by having a second counter count at twice the clock frequency until the content of the memory, which is equal to the sum of the two counts, is reached.

It is alternatively possible to employ a programmable address memory, in which a plurality of addresses can be written in a desired sequence, the next address being searched for after each end of a piece of music.

It is also possible to record special codes at specific points on the record carrier, for example for a command for searching the end of the tape, if the remaining amount of the tape is not sufficient for a new recording.

What is claimed is:

1. An improved method of addressing and locating information on a record carrier used in an information recording and playback system, the addresses being recorded in the form of digital pulse trains in the same track of said record carrier, wherein the improvement comprises:
   recording an address with a sub-audo frequency at recording and playback speed on said record carrier by recording consecutively at least two preamble pulses and a number of pulses and intervals, corresponding to the ones and zeros of the digitized address, and a number of post-amble pulses equal to the number of preamble pulses;
   entering said address into a first address memory;
   erasing simultaneously a previous address contained in said first address memory when entering said digitized address into said address memory;
   starting the record carrier transport;
   starting a pulse counter upon the first preamble pulse when an address passes a read head;
   advancing said counter one step upon each subsequent pulse;
   measuring the interval between the first two preamble pulses;
   storing predetermined values in a second memory;
   comparing said interval with values stored in said second memory, which values correspond to the minimum and maximum speed of said record carrier; and,
   storing the measured value if it lies between said minimum and maximum speed values in a third memory;
   measuring the interval between the two consecutive preamble pulses if the number of preamble pulses is greater than two,
   determining whether a code pulse appears in a time window near the end of the subsequent intervals which are equal to the mean of the preamble intervals if, within certain limits, the measured values are equal to the interval between the first and second preamble pulse;
   storing a binary value in a code memory, the value being a function of the appearance or non-appearance of a pulse in a time window;
   advancing the pulse counter one step after each interval until said pulse counter reaches a count which is equal to the sum of the total member of preamble, code and post-amble pulses;
   comparing the content of said code memory with the content of said address memory;
   stopping the record carrier transport if said contents correspond in anticipation of re-starting at playback speed;
   switching directly to playback speed; and
   moving said record carrier forward if the content of said code memory is smaller than that of said address memory;
   moving the record carrier in the reverse direction if the content of said code memory is greater than that of the address memory.

2. A method as claimed in claim 1, further comprising:
   inserting check bits between said code pulses, the beginning of the code pulse intervals being synchronized with these check bits; and
   ascertaining the presence of said check bits during searching.

3. A method as claimed in claim 1 or 2, further comprising:
   inserting a check bit at one of two adjoining fixed locations in the code bit row.

4. A method as claimed in claim 1, further comprising:
   rejecting the code as an address after the code has been read into the code memory if all code bits have the same value.

5. An improved apparatus for addressing and locating information on a record carrier provided with means for the insertion of addresses in the informaiton tracks on said record carrier, comprising:
   a first, address memory connected to a device for erasing the address memory and entering an address in digital form into said address memory;
   an address generator connected to said address memory, for generating an address corresponding to the address in said address memory with a sub-audio frequency at recording and playback speed, which address comprises at least two preamble pulses a number of pulses and intervals corresponding to the ones and zeros in said address memory, and a number of post-amble pulses equal to the number of preamble pulses;
   a circuit connected to said address generator output having a write head for recording said addresses;
   a read head connected to a pulse counter which upon the arrival of the first pre-amble pulse of an address is started and which is advanced one step by each subsequent pulse (and interval);
   a time measuring device also started by said first preamble pulse and which measures the interval between every two preamble pulses;
   a second memory which stores the intervals between the first two preamble pulses, corresponding to the minimum and maximum speed of the record carrier;
   a first comparator to which both the time measuring device and the second memory are connected;
   a third memory connected to the output of said first comparator at which a signal appears, if the interval measured by the time measuring device falls between the two values stored in said second memory;
   said third memory also connected to said time measuring device for the storage of the measured interval;
   a second comparator connected to said time measuring device being connected directly and, if the number of preamble pulses is greater than two, also connected to said third memory, for the comparison of the intervals between the first and second preamble pulses and the subsequent preamble pulses;
   means to determine the mean value of these intervals;
   a time window circuit which supplies a signal for a specific period of time around the end of each mean interval;

a sampling circuit connected to said time window circuit which during the time window determines whether a pulse appears during an interval;

a code memory connected to said sampling circuit, in which a code is stored;

a first switching device;

a third comparator, whose first inputs are connected to the outputs of said code memory and whose second inputs are connected to said address memory and whose first output, at which a signal appears if the content of the code memory corresponds to the content of said address memory;

the stop switch of said record carrier connected to said third comparator;

a switch connected to a second output of said third comparator, at which output a signal appears if the content of the code memory is smaller than that of the address memory for the forward transport of the record carrier;

a switch for the reverse transport of the record carrier connected to a third output of the third comparator, at which output a signal appears if the content of the code memory is greater than the address memory.

6. An apparatus as claimed in claim 5 further including a second switching device having a control input connected to the location of the code memory in which a check bit is stored and connected in series with the first switching device.

7. An apparatus as claimed in claim 5 or 6 wherein the adjoining locations in the code memory, which should contain one check bit in the code, are connected to the input of at least one, the output of the OR-circuit being connected to the control input of the second switching device.

8. An apparatus as claimed in claim 6 wherein the outputs of the code memory are each connected to an input of an AND-circuit, whose output leads to the control input of a third switching device, which is connected in series with the first switching device.

9. An aparatus as claimed in claim 5, wherein there is provided a programmable digital signal processing unit controlled by a program.

* * * * *

UNITED STATES PATENT OFFICE
CERTIFICATE OF CORRECTION

Patent No. 4,237,498    Dated December 2, 1980

Inventor(s) Gustavus L.P. van Eijck et al

It is certified that error appears in the above-identified patent and that said Letters Patent are hereby corrected as shown below:

Col. 9, line 14,  Change "sub-audo" to --sub-audio--

Col. 9, line 55,  After "total" delete "member"

and insert --number--

Col. 10, line 19,  Change "informaiton" to

-- information --

Signed and Sealed this

Ninth Day of June 1981

[SEAL]

Attest:

RENE D. TEGTMEYER

*Attesting Officer*    *Acting Commissioner of Patents and Trademarks*